(12) United States Patent
Johnson

(10) Patent No.: US 11,591,081 B2
(45) Date of Patent: Feb. 28, 2023

(54) VERTICAL-LIFT AUGMENTATION SYSTEM

(71) Applicant: Textron Innovations Inc., Providence, RI (US)

(72) Inventor: Christopher M. Johnson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 232 days.

(21) Appl. No.: 16/896,082

(22) Filed: Jun. 8, 2020

(65) Prior Publication Data

US 2021/0380234 A1 Dec. 9, 2021

(51) Int. Cl.
*B64C 29/00* (2006.01)

(52) U.S. Cl.
CPC ...... *B64C 29/0033* (2013.01); *B64C 29/0025* (2013.01)

(58) Field of Classification Search
CPC ....... B64C 3/32; B64C 29/0033; B64D 27/06; B64D 27/12; B64D 27/18; B64D 27/08; B64D 27/14; B64D 27/20
See application file for complete search history.

(56) References Cited

U.S. PATENT DOCUMENTS

| | | | |
|---|---|---|---|
| 3,360,217 A * | 12/1967 | Trotter | B64C 29/0033 D12/330 |
| 2015/0274289 A1* | 10/2015 | Newman | B64C 29/0025 244/12.4 |
| 2017/0158321 A1* | 6/2017 | Mia | B64C 29/0025 |
| 2017/0349273 A1 | 12/2017 | Parsons et al. | |
| 2017/0349274 A1 | 12/2017 | Fenny et al. | |
| 2018/0057157 A1 | 3/2018 | Groninga et al. | |
| 2018/0208305 A1 | 7/2018 | Lloyd et al. | |
| 2018/0215462 A1 | 8/2018 | Fenny et al. | |
| 2018/0237136 A1* | 8/2018 | Choi | B64C 3/14 |
| 2018/0244376 A1 | 8/2018 | Fenny et al. | |
| 2018/0362160 A1 | 12/2018 | Groninga et al. | |
| 2019/0023389 A1* | 1/2019 | Murrow | B64D 31/06 |

FOREIGN PATENT DOCUMENTS

WO WO-2019150128 A1 * 8/2019 ......... B64C 29/0008

\* cited by examiner

*Primary Examiner* — Richard Green
*Assistant Examiner* — William L Gmoser
(74) *Attorney, Agent, or Firm* — Shackelford, Bowen, McKinley & Norton, LLP

(57) ABSTRACT

In an embodiment, a vertical-lift augmentation system for an aircraft includes a fan bank mounted to the aircraft in proximity to a wing of the aircraft, where the fan bank may include at least one fan. The vertical-lift augmentation system also includes a panel movably attached to the aircraft in relation to the fan bank, where the panel is adjustable between at least a first position in which the panel encloses the fan bank in the aircraft and a second position in which the panel at least partially exposes the fan bank.

6 Claims, 4 Drawing Sheets

VERTICAL-LIFT AUGMENTATION SYSTEM

BACKGROUND

Technical Field

The present disclosure relates generally to aircraft and more particularly, but not by way of limitation, to a vertical-lift augmentation system for aircraft.

History of Related Art

Ducted-rotor aircraft have at least one ducted rotor for providing lift and propulsion forces. Each ducted rotor typically has internal structure that supports a motor of the aircraft and an aerodynamic exterior skin.

SUMMARY

In an embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a vertical-lift augmentation system for an aircraft includes a first fan bank mounted to a wing of the aircraft on a first side of a fuselage of the aircraft, where the first fan bank may include at least one fan. The vertical-lift augmentation system also includes a second fan bank mounted to the wing of the aircraft on a second side of the fuselage opposite the first side. The vertical-lift augmentation system also includes a first panel movably attached to the wing in relation to the first fan bank, where the first panel is adjustable between at least a first position in which the first panel encloses the first fan bank in the wing and a second position in which the first panel at least partially exposes the first fan bank. The vertical-lift augmentation system also includes a second panel movably attached to the wing in relation to the second fan bank, where the second panel is adjustable between at least a first position in which the second panel encloses the second fan bank in the wing and a second position in which the second panel at least partially exposes the second fan bank. Other embodiments of this aspect include corresponding computer systems, apparatus, and computer programs recorded on one or more computer storage devices, each configured to perform one or more actions.

In another general aspect, a method of augmenting vertical lift on an aircraft having at least a first mode of operation and a second mode of operation different from the first mode of operation includes adjusting a panel movably attached to a wing of the aircraft to a first position in which the panel encloses a wing-mounted fan bank in the wing. The wing-mounted fan bank may include at least one fan. The method also includes disengaging the at least one fan. Other embodiments of this aspect include corresponding computer systems, apparatus, and computer programs recorded on one or more computer storage devices, each configured to perform one or more actions of the method.

In another general aspect, a vertical-lift augmentation system for an aircraft includes a fan bank mounted to the aircraft in proximity to a wing of the aircraft, where the fan bank may include at least one fan. The vertical-lift augmentation system also includes a panel movably attached to the aircraft in relation to the fan bank, where the panel is adjustable between at least a first position in which the panel encloses the fan bank in the aircraft and a second position in which the panel at least partially exposes the fan bank. Other embodiments of this aspect include corresponding computer systems, apparatus, and computer programs recorded on one or more computer storage devices, each configured to perform one or more actions.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
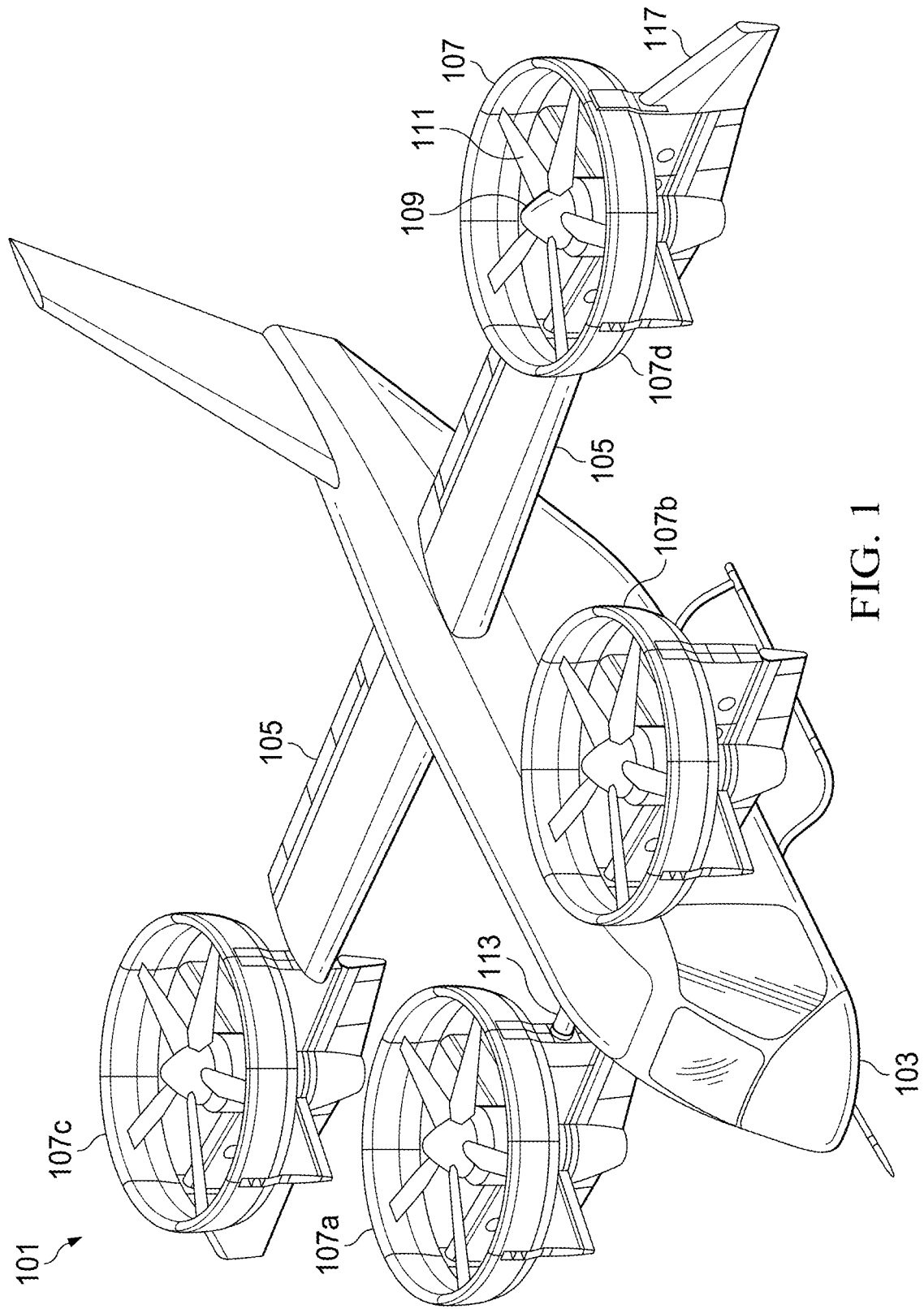
FIG. 1 is an oblique view of an aircraft with ducted rotors, with the ducted rotors configured for the aircraft to operate in helicopter mode.
Figure 2:
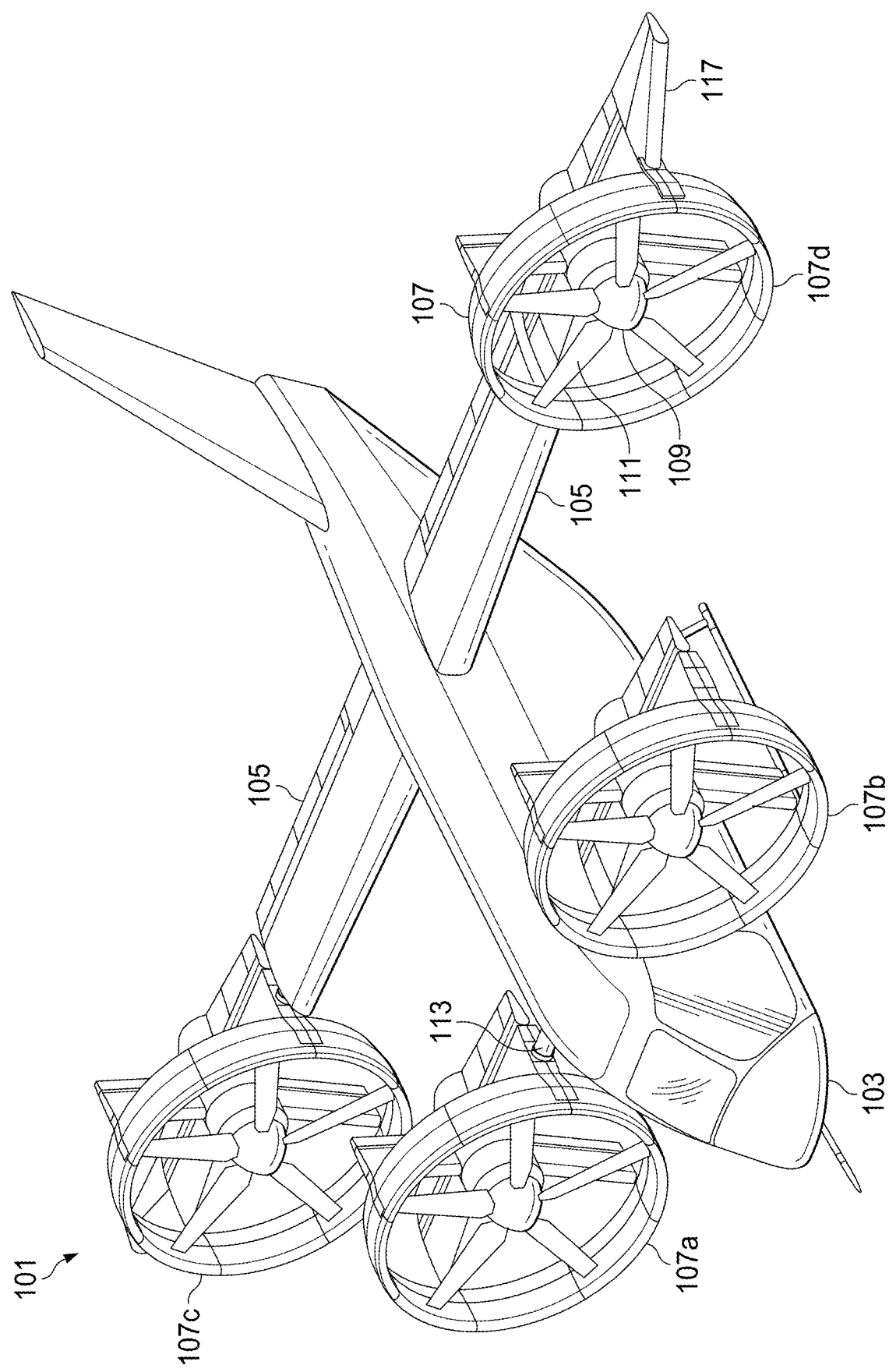
FIG. 2 is an oblique view the aircraft depicted in FIG. 1, with the ducted rotors configured for the aircraft to operate in airplane mode.

FIGS. 1 and 2 are oblique views of a ducted-rotor aircraft 101. Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. For example, ducts 107a and 107b are shown to be coupled directly to fuselage 103 by a spindle 113. Ducts 107c and 107d are each similarly coupled to a corresponding end of wing 105 via a respective spindle. As shown, each of ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107.

Figure 3A:
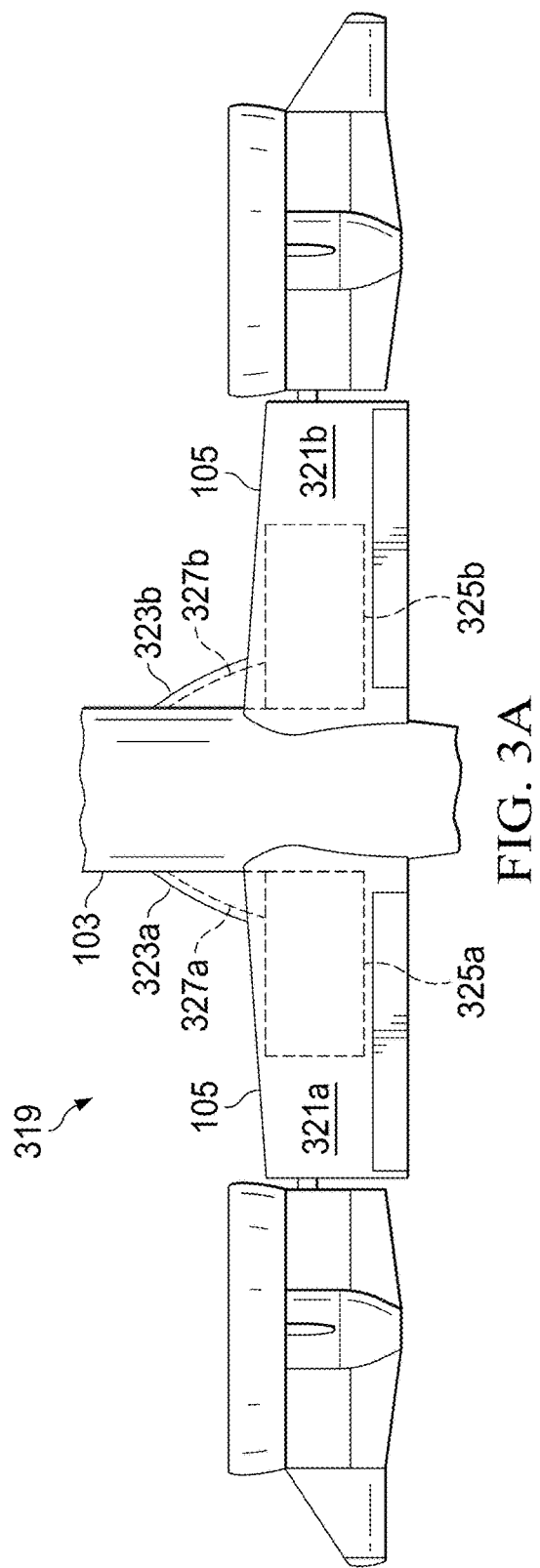
FIG. 3A is a top view of a vertical-lift augmentation system that is configured for airplane mode.
Figure 3B:
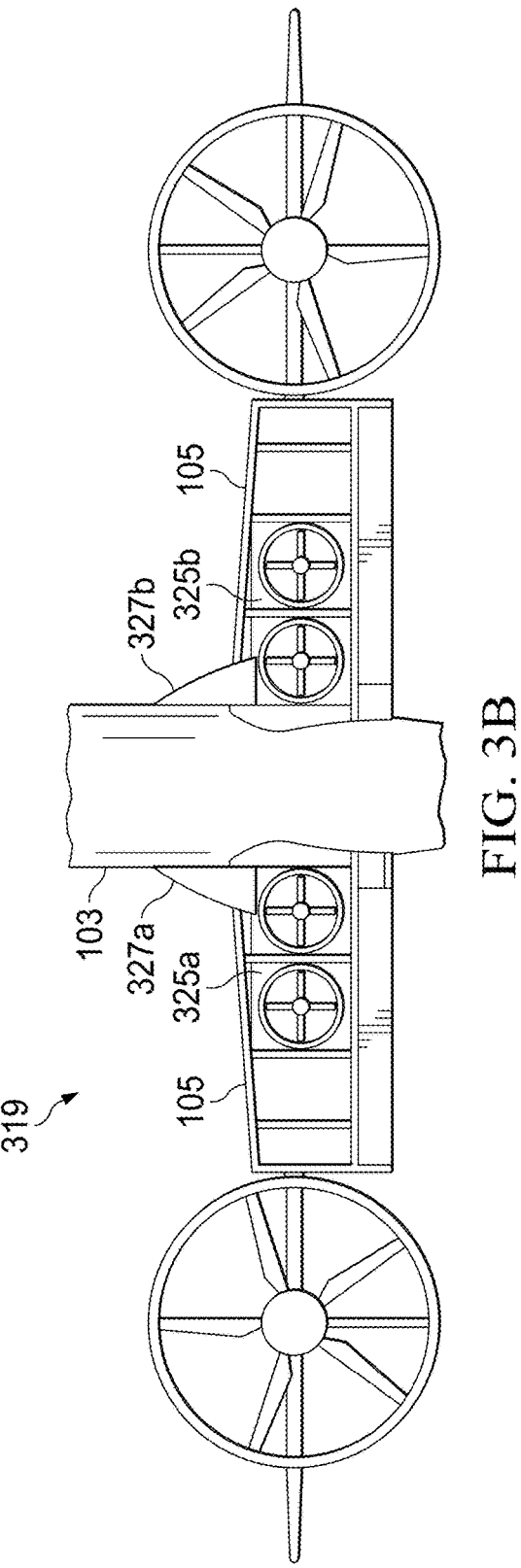
FIG. 3B is a top view of a vertical-lift augmentation system that is configured for helicopter mode.

FIGS. 3A and 3B are top views of a vertical-lift augmentation system 319. The vertical-lift augmentation system 319 includes one or more fan banks that are mounted in proximity to the fixed wing 105, namely, wing-mounted fan banks 325a and 325b and fuselage-mounted fan banks 327a and 327b. The wing-mounted fan banks 325a and 325b and the fuselage-mounted fan banks 327a and 327b can each include one or more motor-driven fans as will be described in greater detail relative to FIGS. 4 and 5. In a typical embodiment, the wing-mounted fan banks 325a and 325b and the fuselage-mounted fan banks 327a and 327b are mounted or installed such that the motor-driven fans therein are facing upward. In the illustrated embodiment, the vertical-lift augmentation system 319 further includes one more adjustable panels that are disposed in proximity to the fixed wing 105, namely, wing-based adjustable panels 321a and 321b and fuselage-based adjustable panels 323a and 323b.

The wing-based adjustable panels 321a and 321b are movably attached to the fixed wing 105 on left (port) and right (starboard) sides, respectively, of the fuselage 103. In a typical embodiment, the wing-based adjustable panels 321a and 321b are adjustable between or among various positions. For example, the wing-based adjustable panel 321a is adjustable between a closed position in which it encloses the wing-mounted fan bank 325a in the aircraft (e.g., within the fixed wing 105) and an open position in which it exposes or uncovers the wing-mounted fan bank 325a in whole or in part. The wing-based adjustable panel 321b is similarly adjustable between closed and open positions relative to the wing-mounted fan bank 325b. FIG. 3A illustrates an example of closed positions of the wing-based adjustable panels 321a and 321b, with the wing-mounted fan banks 325a and 325b being shown via dashed lines in order to demonstrate that they are located beneath the wing-based adjustable panels 321a and 321b, respectively. FIG. 3B illustrates an example of open positions of the wing-based adjustable panels 321a and 321b, with the wing-mounted fan banks 325a and 325b being shown with fans therein in order to demonstrate that they are now exposed or uncovered. It should be appreciated that the quantity and size of fans depicted within the wing-mounted fan banks 325a and 325b are merely illustrative in nature. In various embodiments, the wing-mounted fan banks 325a and 325b can include any number of fans of any given size to suit a given implementation.

In certain embodiments, the wing-based adjustable panels 321a and 321b can each operate as a door that includes one, two, three or any other suitable number of components that function to open or close. In general, the wing-based adjustable panels 321a and 321b can open and close in any suitable fashion, including but not limited to swinging, folding, sliding, combinations of the foregoing and/or the like. The wing-based adjustable panels 321a and 321b can span an entirety of left and right portions of the fixed wing 105, or any portion thereof that is of sufficient size to selectively cover or expose the wing-mounted fan banks 325a and 325b, respectively, as described previously. For example, the wing-based adjustable panels 321a and 321b can each be, or include, a top surface or skin (or portion thereof) of the fixed wing 105.

The fuselage-based adjustable panels 323a and 323b are movably attached to the fuselage 103 at left and right wing roots, respectively, of the fixed wing 105. In similar fashion to the wing-based adjustable panels 321a and 321b, the fuselage-based adjustable panels 323a and 323b are adjustable between or among various positions. For example, the fuselage-based adjustable panel 323a is adjustable between a closed position in which it encloses the fuselage-mounted fan bank 327a in the aircraft 101 (e.g., within the fuselage 103) and an open position in which it exposes or uncovers the fuselage-mounted fan bank 327a in whole or in part. The fuselage-based adjustable panel 323b is similarly adjustable between closed and open positions relative to the fuselage-mounted fan bank 327b. FIG. 3A illustrates an example of closed positions of the fuselage-based adjustable panels 323a and 323b, with the fuselage-mounted fan banks 327a and 327b being shown via dashed lines in order to demonstrate that they are located beneath the fuselage-based adjustable panels 323a and 323b, respectively. FIG. 3B illustrates an example of open positions of the fuselage-based adjustable panels 323a and 323b. For simplicity of illustration, the fuselage-mounted fan banks 327a and 327b are shown via solid lines in order to demonstrate that they are now exposed or uncovered. It should be appreciated that the fuselage-mounted fan banks 327a and 327b can include fans of the same size, or of a similar size, as those shown within the wing-mounted fan banks 325a and 325b.

In certain embodiments, the fuselage-based adjustable panels 323a and 323b can each operate as a door that includes one, two, three or any other suitable number of components that function to open or close. In general, the fuselage-based adjustable panels 323a and 323b can open and close in any suitable fashion, including but not limited to swinging, folding, sliding, combinations of the foregoing and/or the like. The fuselage-based adjustable panels 323a and 323b can span any portion of the fuselage 103 that is of sufficient size to selectively cover or expose the fuselage-mounted fan banks 327a and 327b, respectively, as described previously. For example, the fuselage-based adjustable panels 323a and 323b can each be, or include, a surface or skin (or portion thereof) of the fuselage 103, such as all or part of a wing root fairing.

In various embodiments, the wing-based adjustable panels 321a and 321b and the fuselage-based adjustable panels 323a and 323b can adjust to closed positions when the aircraft 101 is in, or converts to, airplane mode, and to open positions when the aircraft 101 is in, or converts to, helicopter mode. By way of illustration, FIG. 3A shows the fixed wing 105 configured with a smoother surface that is more suitable for forward flight while the aircraft 101 is in airplane mode. FIG. 3B, in contrast, shows the wing-based adjustable panels 321a and 321b and the fuselage-based adjustable panels 323a and 323b in open positions while the aircraft 101 is in helicopter mode so as to expose or uncover the wing-mounted fan banks 325a and 325b and the fuselage-mounted fan banks 327a and 327b.

In certain embodiments, the wing-mounted fan banks 325a and 325b and the fuselage-mounted fan banks 327a and 327b can provide augmented vertical thrust while the aircraft 101 is in helicopter mode, for example, by engaging when the aircraft 101 is in, or converts to, helicopter mode. In general, the engagement of the wing-mounted fan banks 325a and 325b and the fuselage-mounted fan banks 327a and 327b can occur in coordination with, or at or near the same as, the adjustment of the wing-based adjustable panels 321a and 321b and the fuselage-based adjustable panels 323a and 323b to open positions. In this way, the wing-mounted fan banks 325a and 325b and the fuselage-mounted fan banks 327a and 327b can augment vertical thrust while the aircraft is in helicopter mode, or at any time when augmented vertical thrust is desirable.

In various embodiments, the wing-mounted fan banks 325a and 325b and the fuselage-mounted fan banks 327a and 327b can disengage when the aircraft 101 is in, or converts to, airplane mode. In general, the disengagement of the wing-mounted fan banks 325a and 325b and the fuselage-mounted fan banks 327a and 327b can occur in coordination with, or at or near the same as, the adjustment of the wing-based adjustable panels 321a and 321b and the fuselage-based adjustable panels 323a and 323b to closed positions. Accordingly, the wing-mounted fan banks 325a and 325b and the fuselage-mounted fan banks 327a and 327b can be disengaged and enclosed in the aircraft 101 while the aircraft 101 is in airplane mode.

In certain embodiments, the wing-based adjustable panels 321a and 321b, the fuselage-based adjustable panels 323a and 323b, the wing-mounted fan banks 325a and 325b and the fuselage-mounted fan banks 327a and 327b can be commanded to operate in the fashion described above by an operator of the aircraft 101 and/or by a flight control computer. For example, in a fly-by-wire configuration, during a first mode of operation of the aircraft 101 such as airplane mode, the flight control computer can: (a) instruct the wing-based adjustable panels 321a and 321b and the fuselage-based adjustable panels 323a and 323b to adjust to closed positions; and (b) instruct the wing-mounted fan banks 325a and 325b and the fuselage-mounted fan banks 327a and 327b to disengage. Similarly, continuing this example, during a second mode of operation of the aircraft 101 such as helicopter mode, the flight control computer can: (a) instruct the wing-based adjustable panels 321a and 321b and the fuselage-based adjustable panels 323a and 323b to adjust to open positions; and (b) instruct the wing-mounted fan banks 325a and 325b and the fuselage-mounted fan banks 327a and 327b to engage. It should be appreciated that, in various implementations, similar instructions or commands can also be issued by the operator of the aircraft 101.

For illustrative purposes, four fan banks and four adjustable panels are shown in FIGS. 3A and 3B. It should be appreciated, however, that the configuration shown in FIGS. 3A and 3B can be varied to suit a given implementation. For example, some embodiments may include the wing-based adjustable panels 321a and 321b and the wing-mounted fan banks 325a and 325b, while excluding the fuselage-based adjustable panels 323a and 323b and the fuselage-mounted fan banks 327a and 327b. In these embodiments, augmented vertical thrust can be provided via operation of the wing-based adjustable panels 321a and 321b and the wing-mounted fan banks 325a and 325b as described previously. In another example, some embodiments may include the fuselage-based adjustable panels 323a and 323b and the fuselage-mounted fan banks 327a and 327b, while excluding the wing-based adjustable panels 321a and 321b and the wing-mounted fan banks 325a and 325b. In these embodiments, augmented vertical thrust can be provided via operation of the fuselage-based adjustable panels 323a and 323b and the fuselage-mounted fan banks 327a and 327b as described previously. Other examples and variations will be apparent to one skilled in the art after a detailed review of the present disclosure.

Figure 4:
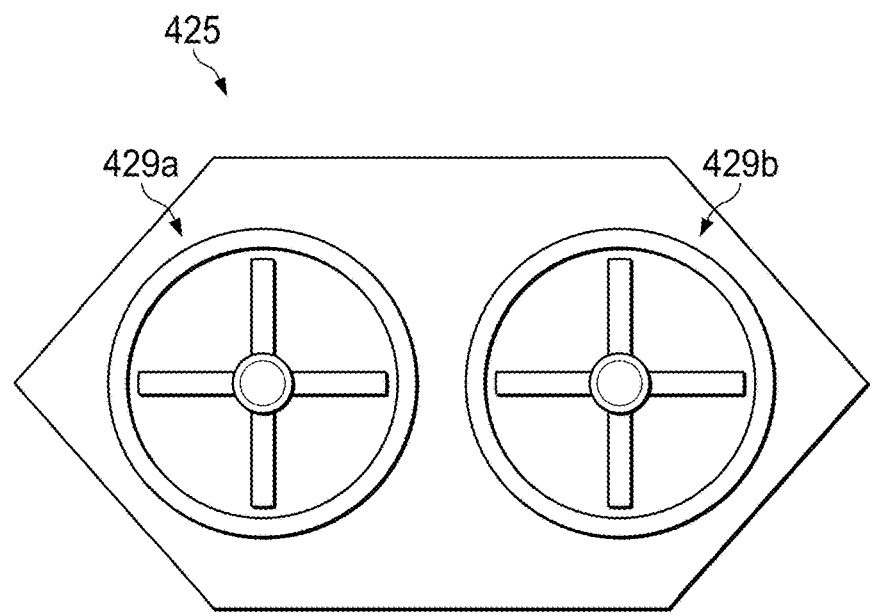
FIG. 4 illustrates an example fan bank.

FIG. 4 illustrates an example of a fan bank 425 that includes fans 429a and 429b, which can be fixed blade pitch electrically-driven and/or variable-speed motors. The fans 429a and 429b can provide augmented vertical thrust for the aircraft 101 of FIGS. 1 and 2. For example, a fan bank similar to the fan bank 425 can be used for each of the wing-mounted fan banks 325a and 325b of FIGS. 3A and 3B. Although two fans are shown in the fan bank 425 for illustrative purposes, it should be appreciated any number of fans can be utilized to suit a given implementation.

Figure 5:
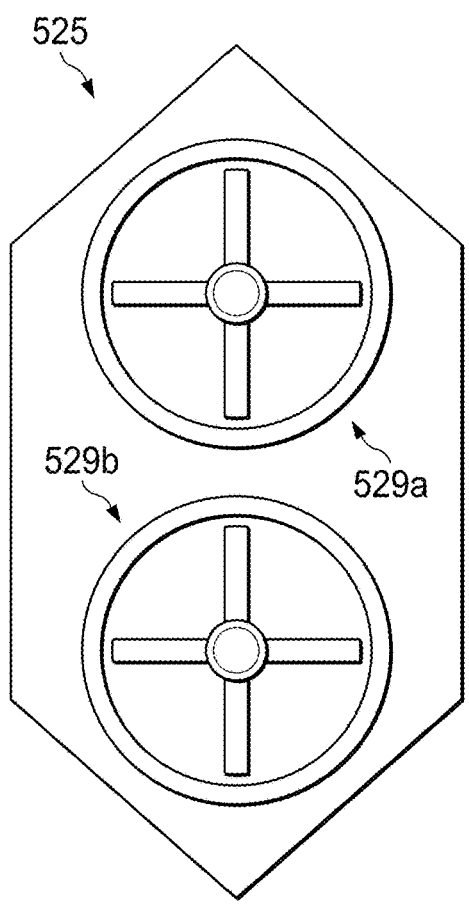
FIG. 5 illustrates an example fan bank.

FIG. 5 illustrates an example of a fan bank 525 that includes fans 529a and 529b, which can be, for example, fixed blade pitch electrically-driven and/or variable-speed motors. The fans 529a and 529b can provide augmented vertical thrust for the aircraft 101 of FIGS. 1 and 2. For example, a fan bank similar to the fan bank 525 can be used for each of the fuselage-mounted fan banks 327a and 327b of FIGS. 3A and 3B. Although two fans are shown in the fan bank 525 for illustrative purposes, it should be appreciated any number of fans can be utilized to suit a given implementation.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An aircraft operable in an airplane mode and a helicopter mode;
the aircraft comprising:
   a fuselage;
   a forward pair of ducted rotors rotatably coupled directly to the fuselage on opposite sides of the fuselage;
   a wing extending from the fuselage aft of the forward pair of ducted rotors;
   an aft pair of ducted rotors rotatably mounted at opposite outboard ends of the wing, wherein the forward pair and the aft pair of ducted rotors provide forward thrust when the aircraft is in an airplane mode and vertical thrust when the aircraft is in a helicopter mode;
   a first fan bank mounted to the wing on a first side of the fuselage, wherein the first fan bank is configured to provide vertical thrust when engaged;

a second fan bank mounted to the wing on a second side of the fuselage opposite the first side, wherein the second fan bank is configured to provide vertical thrust when engaged;

a first panel movably attached to the wing in relation to the first fan bank, wherein the first panel is adjustable between at least a closed position in which the first panel encloses the first fan bank in the wing in the airplane mode and an open position in which the first panel at least partially exposes the first fan bank in the helicopter mode;

a second panel movably attached to the wing in relation to the second fan bank, wherein the second panel is adjustable between at least a closed position in which the second panel encloses the second fan bank in the wing in the airplane mode and an open position in which the second panel at least partially exposes the second fan bank in the helicopter mode;

a third fan bank mounted to the first side of the fuselage adjacent to a first wing root of the wing;

a third panel movably attached to the fuselage in relation to the third fan bank, wherein the third panel is adjustable between at least a closed position in which the third panel encloses the third fan bank in the fuselage and an open position in which the third panel at least partially exposes the third fan bank;

a fourth fan bank mounted to the second side of the fuselage adjacent to a second wing root of the wing; and a fourth panel movably attached to the fuselage in relation to the fourth fan bank, wherein the fourth panel is adjustable between at least a closed position in which the fourth panel encloses the fourth fan bank in the fuselage and an open position in which the fourth panel at least partially exposes the fourth fan bank.

2. The aircraft of claim 1, wherein the first panel and the second panel each comprise at least a portion of a surface of the wing.

3. The aircraft of claim 1, wherein the first fan bank and the second fan bank each comprise a plurality of fans.

4. The aircraft of claim 1, wherein the third panel and the fourth panel each comprise at least a portion of a wing root fairing.

5. A method of augmenting vertical lift on an aircraft having an airplane mode of operation and a helicopter mode of operation, the method comprising:

during the airplane mode:
operating a forward pair of ducted rotors and an aft pair of ducted rotors to produce forward thrust, wherein the forward pair of ducted rotors are rotatably coupled directly to a fuselage on opposite sides of the fuselage and the aft pair of ducted fans are rotatably mounted on outboard opposite ends of a wing aft of the forward pair of ducted rotors;
enclosing a wing-mounted fan bank inside of the wing with a moveable wing panel;
enclosing, with a moveable fuselage panel, a fuselage-mounted fan bank mounted to the fuselage adjacent to a root of the wing;
disengaging the wing-mounted fan bank when enclosed; and
disengaging the fuselage-mounted fan bank when enclosed; and during the helicopter mode:
operating the forward pair and the aft pair of ducted rotors to produce forward thrust;
adjusting the wing panel to an open position in which the wing panel at least partially exposes the wing-mounted fan bank;
adjusting the fuselage panel to an open position in which the fuselage panel at least partially exposes the fuselage-mounted fan bank;
engaging the wing-mounted fan bank to produce vertical thrust; and
engaging the fuselage-mounted fan bank to produce vertical thrust.

6. The method of claim 5, wherein the wing-mounted fan bank comprises a plurality of fans.

* * * * *